UNITED STATES PATENT OFFICE 2,684,943

LUBRICANTS

Edwin R. Baker, Ponca City, Okla., assignor to Continental Oil Company, Ponca City, Okla., a corporation of Delaware No Drawing. Application November 1, 1950, Serial No. 193,534

6 Claims. (Cl. 252—33.4)

This invention relates to improved organic compositions and more particularly pertains to the elimination of malodorous liberation of hydrogen sulfide from organic liquid compositions. Still more specifically, the invention relates to the prevention of hydrogen sulfide odor in lubricating oil compositions, which release hydrogen sulfide particularly upon standing, by virtue of incorporated compounds undergoing chemical change.

Organic compositions containing dissolved hydrogen sulfide or compounds tending to evolve or form hydrogen sulfide upon standing or use usually possess an undesirable bad odor. For example, in the petroleum industry hydrogen sulfide is customarily found in minor amounts in various hydrocarbon oils, such as gasoline, naphtha, kerosene, fuel oil, furnace oils, etc., and it is necessary to accord special treatment to the oils to remove the bad odor caused by the release of hydrogen sulfide. The problem is especially acute in the case of lubricating oils, because in addition to any hydrogen sulfide which may be originally present, the sulfurized additives which are used therein to improve lubricating characteristics may undergo chemical changes which release hydrogen sulfide. Various other industries are confronted with the same problem, and in every case, the cost of removing the bad odor caused by hydrogen sulfide is appreciable. For various reasons the heretofore means of stabilizing organic compositions against the release or evolution of hydrogen sulfide have not been satisfactory. Where it is only necessary to remove normally dissolved hydrogen sulfide from an organic composition, the known methods have been either too expensive or not sufficiently effective. As for the situation where the odor problem is primarily due to or aggravated by incorporated sulfur-containing compounds undergoing change or decomposition, the known methods of sweetening are still less satisfactory because some of the desirable constituents of the composition are impaired or are rendered ineffective by such sweetening treatment. Therefore, by means of the present invention, the difficulties encountered in freeing organic compositions from the malodorous evolution of hydrogen sulfide are substantially overcome.

During the development of the present invention, U. S. Patent 2,496,508 by Watson at al. issued on February 7, 1950, wherein it is disclosed that the evolution of hydrogen sulfide from organic sulfur-containing compositions can be inhibited by the addition of organic epoxides. The present invention is an improvement thereover based on my discovery that a catalyst cooperating with the epoxy compound is essential for the complete effectiveness of epoxides in order to substantially eliminate hydrogen sulfide odor under all conditions of temperature and moisture which prevail in handling, storage and use of $H_2S$-evolving compositions as will be fully disclosed hereinafter.

It is an object of the present invention to provide improved organic compositions. Another object is to provide improving or stabilizing agents which are especially adapted for preventing the liberation of hydrogen sulfide from organic compositions, particularly under prevailing atmospheric conditions. Still another object of the present invention is to provide a selective stabilizing agent in combination with an activator or catalyst so as to be effective against the malodorous liberation of hydrogen sulfide from organic compositions when stored or standing under prevailing atmospheric conditions, particularly for lubricating oil compositions which contain compounds tending to evolve or release hydrogen sulfide. A further object is to provide a method of stabilizing organic compositions against the malodorous liberation of hydrogen sulfide without detrimental effect upon the use to which the compositions are put. Other advantages and objects will be apparent from the following description and explanation thereof.

Broadly stated, the present invention comprises the stabilization of organic compositions against the malodorous evolution of hydrogen sulfide therefrom by the addition of an organic epoxy compound together with an activating catalyst which will be either a metal oxy grouping therein or a separate non-acidic organic metal salt.

Generally, the present invention is effective in combating the malodorous liberation of hydrogen sulfide from organic compositions, with particular reference to lubricating oils, whether merely dissolved in a given amount or constantly increasing by virtue of sulfur-containing constituents undergoing changes which evolve hydrogen sulfide.

This invention is of particular utility in stabilizing the malodorous evolution of hydrogen sulfide in the case of lubricating oils containing sulfurized additives which will undergo chemical change and evolve hydrogen sulfide, particularly prior to use, as well as induced by conditions of usage. The lubricating oils containing additives which evolve hydrogen sulfide can be of mineral, vegetable, animal or marine origin; examples of the additives referred to therein are sulfurized terpenes, sulfurized olefins and olefin polymers, sulfurized fatty oils such as sulfurized sperm oil, sulfurized mineral oils, etc. In these lubricants, the effectiveness of the epoxy compound in controlling hydrogen sulfide evolution is remarkably enhanced by the conjoint use of a catalyst component without impairing or interfering with components or constituents which are desirably present in the lubricating composition. In lubricating oils, it is well known that many sulfurized compounds effective for inhibiting bearing corrosion or for imparting other lubrication needs nevertheless give the oil an offensive hydrogen sulfide odor. In particular, the reaction products of organic compounds with $P_2S_5$ which are used as additives appear to produce more odor than when the sulfur is introduced with other reagents such as sulfur chloride, elemental sulfur, etc.

As a further detriment, it has been found commercially that combinations of certain additives frequently make the odor condition worse. For example, one particular combination which develops appreciable amounts of hydrogen sulfide on standing is a lubricating oil which contains the combination of a reaction product of $P_2S_5$ with turpentine, and a KOH-neutralized reaction product of $P_2S_5$ with an isobutylene polymer or other metal neutralized organic phosphorus- and sulfur-containing detergent-type additive.

I have found that the apparent reason for the aggravated hydrogen sulfide evolution by such a combination of additives is primarily due to the nature of the base neutralized $P_2S_5$-olefin detergents. While these detergents are said to be "neutralized," they are not fully neutral since they do retain appreciable acidic properties as shown by the ASTM procedure D664-49. According to this ASTM method I have found, for example, that the KOH neutralized reaction product of $P_2S_5$ with an isobutylene polymer has an acid number of 6 mg. KOH/gram which is sufficient to actually promote hydrogen sulfide release from the companion sulfur-bearing additives.

In contradistinction to the Watson disclosure cited above, I have discovered that non-acidic organic metal salts will catalyze the complete effectiveness of the epoxy compounds in combating hydrogen sulfide release even in the presence of the metal-base treated phosphorus- and sulfur-containing detergents. I have also found that of the substantially non-acidic organic metal salts, the polyvalent metal salts are to be preferred since they are particularly effective in catalyzing epoxy compounds for the purposes of this invention.

THE ORGANIC EPOXY COMPOUNDS

The organic epoxy compounds of the present invention are represented by the following structural formula:

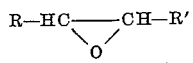

in which the R and R' components are selected from the group consisting of hydrogen and organic radicals, and of which at least one R-component is an organic radical. When R and R' are both organic radicals, they can be alike or dissimilar. More specifically, the organic radicals include such classes as alkyl, cycloalkyl, alkylene, aryl, alkaryl, aralkyl, hetero-linked cyclic or acyclic radicals, etc. The organic radicals can also contain in addition to carbon and hydrogen, other substituents such as, for example, hydroxyl, nitro, carboxyl, sulfur, a metal salt substituent, ethoxy, amino, imino, keto, etc. Halogen can also be included as a substituent, provided however that it is not adjacent to the epoxy group and then only in compounds containing 6 or more carbon atoms. Hetero linking elements or groups that can be included in the organic radical are, for example, oxygen, nitrogen, sulfur, oxycarbonyl, etc. When the epoxy compound according to the above definition contains the metal salt substituent, it is self-catalyzing for the purposes of this invention.

Examples of specific compounds coming within the scope of the aforementioned structural formula include 2,3-epoxy pentane, 1,2-epoxy octadecane, 2-methyl 2,3-epoxy butane, epoxy hexanes, epoxy nonanes, styrene epoxide, epoxy mesityloxide, sodium 9,10-epoxy stearate, calcium 9,10-epoxy stearate, mixed condensation product of alkyl phenyl mercaptan and ethylene oxide having the structural formla:,

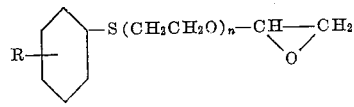

wherein R is an alkyl group, and $n$ is an integer of about 2-10; toloxy epoxy propane, methyl dichloro epoxystearate, etc.

Generally, the epoxy compounds of the present invention may be prepared by any one of at least three methods given below. The first method involves the reaction of an olefin with a peracid such as, for example perbenzoic, performic or peracetic acid. Details covering this method will be found in the article "Organic Peracids" written by Daniel Swern, in Chemical Reviews, 45 No. 1 (August 1949). The second method involves the reaction of epichlorhydrin with a phenol, and is described in an article written in the Journal of the Chemical Society, 93, 839-941, 1908. Whereas the third method involves the addition of ethylene oxide to organic acids, alcohols, mercaptans, amines, amides, etc., to result in a considerable proportion of an epoxide having the structure:

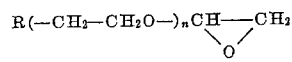

wherein R represents the radicals of the organic reactants just listed, and $n$ is a whole number. The product resulting from the above condensation reaction is usually a mixture of the epoxide and ether-alcohols, and the desired epoxide can be separated by distillation or other suitable means.

Apart from catalysts as a separate compound described fully hereinafter, it was unexpectedly discovered that organic epoxy compounds containing metal are also effective as stabilizing agents. Apparently, the presence of the metal within the epoxide molecule will also catalyze the action of the epoxy grouping therein for prevention of hydrogen sulfide liberation. In general, the presence of mono- or polyvalent metals in the organic epoxy compounds bring about a self-catalyzing effect. The metals which can be employed include the alkali and alkaline earth metals, heavy metals, etc., such as for example sodium, potassium, calcium, barium, strontium, magnesium, aluminum, zinc, cadmium, cobalt, nickel, tin, copper, etc. The organic epoxy compounds from which these metal containing compounds are derived usually contain acidic substituents to thus combine with the metals. The acidic substituents include a variety of radicals such as for example hydroxyl, carboxyl, amido, phosphonic, phosphoric, etc. Of the metal-containing epoxy compounds which are useful self catalyzers in preventing malodorous liberation of hydrogen sulfide from organic compositions, it is found that the polyvalent metal-containing compounds are more satisfactory.

It is to be understood that all of the organic epoxy compounds are not equivalent in effectiveness in stabilizing organic compositions against the malodorous liberation of hydrogen sulfide, but that for any given set of conditions some compounds are more desirable than others.

CATALYSTS

I have found that the use of organic epoxides are substantially enhanced in their effectiveness in stabilizing or preventing the evolution of hydrogen sulfide from organic compositions, when employed in combination with an organic metal salt compound. This is particularly true when compounded lubricants are stabilized in accordance with the present invention. This function of the catalyst also includes the presence of an activating metal in chemical combination with the organic epoxy compound as already pointed out in the foregoing description regarding the organic epoxy compounds specifically. In this respect, the activating metal is of the same kind as employed in the separate organic metal compounds which are now to be more fully described.

While the function of the organic metal salt compound is not clearly understood, it is evident from my work that organic metal salts which are substantially non-acidic compounds promote or catalyze a chemical or physical reaction between the epoxy compound and the hydrogen sulfide. By non-acidic is meant an acid number less than 0.5 according to the ASTM method already referred to. The organic metal salt compounds which can be employed for this purpose include a variety of classes of compounds such as, for example, metallic salts of fatty acids, naphthenates, phenolates, alcoholates, carboxylates, the corresponding thio analogues, and sulfonates, sulphinates. The selection of the metal-containing organic compound is made in the light of its compatibility with the organic composition to be stabilized as well as the particular epoxide that is used.

Among the wide variety of compounds found useful as catalysts, the phenates and sulphonates are preferred for the reason that these materials are readily available and give especially good results. Other examples of epoxy catalyzing compounds which are applicable to the purposes of this invention include calcium cetyl alcoholate, barium isoamyl thiophenolate, calcium and barium mahogany soaps, aluminum and calcium cetyl phenates, magnesium lauryl chlorphenate, calcium dichlor stearate, calcium naphthenate, nickel naphthenate, calcium chlor phenyl stearate, cobalt chlorphenyl stearate, the metal petroleum sulfonates, the metal salts of alkyl substituted benzene sulphonic acid including the wax substituted benzene sulphonic acids. In the case of lubricating oils, the oil-soluble compounds are preferred for the stated purpose, however, it is to be understood that the insoluble types can also be employed provided a solubilizing agent is also used therewith. The soluble and insoluble types are not equivalent in effectiveness although both are useful for the purposes set forth.

The metals forming the metal-containing organic catalysts or forming a constituent of the epoxy compounds of the present invention include the alkali and alkaline earth metals and heavy metals. Examples of metals coming within this group include lithium, sodium, potassium, calcium, magnesium, barium, strontium, aluminum, zinc, chromium, tin, manganese, lead, etc. While the non-acidic compounds formed by any of these metals are satisfactory for the purposes of this invention, it is preferred to employ polyvalent metals because of their generally greater effectiveness with epoxy compounds in achieving the most satisfactory control of hydrogen sulfide release.

Experimental work under the atmospheric conditions encountered in the storage and handling of lube oil compositions has shown that the reaction rates of organic epoxides with hydrogen sulfide in the absence of a catalyst is so exceedingly slow or non-existent that the odor of hydrogen sulfide continues to persist. Stated another way, the odor persists because the rate of hydrogen sulfide takeup is less than its rate of liberation from sulphur-containing compounds. With a catalyst, an organic epoxide becomes effective in taking up hydrogen sulfide at such a rate that no odor of it can develop.

CONCENTRATIONS

Generally, sufficient amounts of organic epoxy compounds with a catalyst or metal-containing organic compound are employed to stabilize organic compounds against hydrogen sulfide odor, and usually the quantities are minor in proportion to the organic composition. The amount of an organic epoxy compound employed for the purposes of the present invention is based upon its oxirane oxygen content and will be about 0.001 to 0.2 wt. percent oxirane oxygen of the finished organic composition, preferably about .005 to 0.1%. For the purposes of this specification and appended claims, the oxirane oxygen is that oxygen which is present in the form of the cyclic structure,

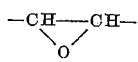

which is characteristic of epoxy compounds. The proportion of the catalyst, when employed as a separate organic metal salt compound, is about .001 to 1.0 wt. percent, preferably about 0.005 to 0.5% by weight on the total composition. In the case of lubricating oils where it is customary to distribute additives as concentrate solutions in an oil base for later addition to manufactured lubricants, the concentration of the organic epoxy compound and catalyst therein will be higher than the values given above; however, in this case the relative amounts of catalyst and epoxy compound will be so adjusted that the amount thereof in the final lubricant blend will be in the range specified. Where the concentrates just described will also contain any of the customary lubrication additives, the relative proportions of all components will be such as to give desired concentrations of each when a given amount of the concentrate is blended with the base stock for a finished lubricating composition.

In determining the efficacy of the organic epoxy compounds and catalysts therewith in the control of hydrogen sulfide, two quantitative test procedures were employed.

Description of the procedures employed in making determinations of the effectiveness of several illustrative combinations of reagents coming within the scope of the present invention are now given.

Quantitative determinations of the rate of reaction of hydrogen sulfide with epoxy compounds were made in accordance with Procedure I which follows:

PROCEDURE I

The rate of reaction of $H_2S$ with epoxides with and without catalysts was determined in an apparatus consisting of a gas burette containing $H_2S$ gas and connected to a reaction flask to which had been added 3 grams of 80 pale oil, in the absence of and with specified amounts of catalyst. The flask with oil, kept at room temperature, was then saturated while stirring with $H_2S$ from the burette, and the remaining $H_2S$ volume reading was taken on the latter. Flow connection between burette and flask was maintained and the system was otherwise closed to the atmosphere. A sample of the organic epoxide to be tested was then introduced hypodermically through a rubber connection into the reaction flask. After the introduction of the sample, the volume of $H_2S$ reacting was then measured by periodic readings of the gas burette. These tests were made at prevailing room temperature. After making appropriate temperature and pressure corrections, the moles of $H_2S$ absorbed per unit of time and its rate of absorption were calculated. Examples of the results of absorption tests with epoxy compounds and a variety of catalysts are shown in Table 1 which follows:

affinity for hydrogen sulfide attained by the epoxy compound. While the results for epichlorhydrin have been included in this table and it, too, shows the effect of catalysis, nevertheless it is an unsatisfactory material especially for a motor lubricant, as will be shown later from test engine results.

Using the method of Procedure I above, a KOH neutralized reaction product of $P_2S_5$-polyisobutylene, prepared as described under Procedure II hereinafter, was tested to determine what catalyzing effect such a material possesses: results are shown in Table 2.

Table 2

| Epoxide compound, Oxirane oxygen Mols × 10⁴ | Catalyst, Mol eq. metal × 10⁴ | Reaction Rate Mols $H_2S$/hr./mol of oxirane oxygen |
|---|---|---|
| Toloxy Epoxy Propane: | | |
| 9.2 | None | 0.00 |
| 8.7 | K-polyisobutylene-$P_2S_5$, 5.0 | 0.00 |

While the material tested for catalytic properties in the foregoing test may be properly defined as an organic metal salt, it does not function as a catalyst. The class of compounds to which this material belongs are acidic as I have already shown, and because of the acidic nature do not act as catalysts. Actually such acidic organic salts appear in many cases to promote the release of hydrogen sulfide from other sulfurized types of oil additives.

Table 1

REACTION RATE—EPOXIDE PLUS $H_2S$ AT ROOM TEMPERATURE

| Example | Epoxide Compound, Oxirane Oxygen Mols × 10⁴ | Catalyst, Mol eq. Metal × 10⁴ | | Reaction Rate Mols $H_2S$/Hr./Mol of Oxirane Oxygen |
|---|---|---|---|---|
| | Epoxy Mesityl oxide | | | |
| 1 | 6.6 | Ca diwax benzene sulfonate | 5.0 | 13.1 |
| 2 | 6.5 | None | | 0.00 |
| | Toloxy epoxy propane | | | |
| 3 | 9.2 | None | | 0.00 |
| 4 | 9.5 | Ca mahogany sulfonate | 5.0 | 9.9 |
| 5 | 8.6 | Ca alkyl phenolate | 5.0 | 8.2 |
| 6 | 8.1 | Ca diwax benzene sulfonate | 5.0 | 7.6 |
| 7 | 8.1 | do | 1.5 | 4.9 |
| 8 | 8.5 | do | 0.5 | 1.3 |
| 9 | 9.0 | Mn (-ous) naphthenate | 5.0 | 2.1 |
| 10 | 8.2 | Zn thio alkaryl phosphate | 5.0 | 1.9 |
| 11 | 9.4 | Ba diwax benzene sulfonate | 5.0 | 1.6 |
| 12 | 8.3 | Ba wax aromatic sulfonate | 5.0 | 1.5 |
| 13 | 8.4 | Ba thio alkyl phenolate | 6.5 | 1.2 |
| 14 | 8.2 | Sn (-ous) thio wax phenol | 5.0 | 1.0 |
| 15 | 8.9 | Li naphthenate | 5.0 | 0.43 |
| 16 | 8.5 | Pb (-ous) naphthenate | 5.0 | 0.33 |
| | Epoxy Nonane | | | |
| 17 | 6.3 | None | | 0.00 |
| 18 | 5.6 | Mn naphthenate | 5.0 | 2.23 |
| 19 | 5.9 | Sn (-ous) sulfurized wax phenol | 5.0 | 0.52 |
| | Decane epoxide-1 | | | |
| 20 | 9.1 | None | | 0.00 |
| 21 | 9.2 | Ca diwax benzene sulfonate | 5.0 | 0.46 |
| | Epichlorhydrin | | | |
| 22 | 21.1 | None | | 0.07 |
| 23 | 15.0 | Ca diwax benzene sulfonate | 5.0 | 5.00 |

It will be noted from the foregoing Table 1 that generally the non-catalyzed epoxy compounds with the exception of epichlorhydrin, do not show any perceptible reactivity with hydrogen sulfide. The results, however, when a catalyst cooperates with the epoxy compound under the same conditions do show the remarkable The examples of Procedure I have shown the reaction of epoxy compounds with free hydrogen sulfide. In like manner, now the effect of epoxy compounds with sulfur-containing compositions which spontaneously release hydrogen sulfide will be shown by the method and examples according to Procedure II which follows:

PROCEDURE II

The method of this procedure consists in passing a stream of dried nitrogen at a rate of one liter per hour through an additive concentrate sample held at 200° F. After the sample has been gas swept for 30 minutes, the gas outlet from the sample container is connected to a hydrogen sulfide absorption train consisting of three vessels in series, each containing 20 ml. of an aqueous lead acetate solution of concentrations in respective order sufficient to absorb 1, 4, and 4 mg. of $H_2S$, thus providing for direct measurement of the $H_2S$ absorbed in totals of 1, 5, and 9 mg. As the test proceeds, the time required for a given total absorption of hydrogen sulfide is noted. The time then, in minutes, correlated with amount of hydrogen sulfide absorbed, is a measure of the protection by the organic epoxy compounds in the additive concentrate against $H_2S$ evolution. In order to facilitate rapid quantitative evaluations of the organic epoxy compounds in these tests, the additive concentrate samples were employed for accelerated testing rather than finished lube oils in which the additive is usually present in small amounts. The additive concentrate consisted of 1.2 parts by weight of a potassium-containing polyisobutylene-$P_2S_5$ reaction product and 1.5 parts by weight of a terpene-$P_2S_5$ reaction product which combination as indicated above shows particularly high evolution of $H_2S$. These additives are prepared as follows:

The KOH neutralized reaction product of $P_2S_5$-polyisobutylene was prepared by reacting 20 weight parts of $P_2S_5$ with 100 parts of polyisobutylene having an approximate molecular weight of 500 and dissolved in 100 parts of 150 pale mineral oil as a diluent, at a temperature of 160° C. for 6 hours. The product, after filtration, was blown for 40 hours with steam at a pressure of 15 lbs./sq. in. while maintaining the kettle at 115° C. KOH solution (40% concentration by weight) to the extent of 8% of the mixture was then added and the whole heated to 125° C. for 4 hours. This product was filtered and used in the test.

Analysis of the product showed:

K=2.5%
P=1.8%
S=0.7%

The $P_2S_5$-terpene product was prepared by reacting 18 weight parts of $P_2S_5$ with 82 parts of turpentine, using 70 parts of 150 pale mineral oil as a diluent, at a temperature of 150° C. for 3 hours. The product was filtered until clear and used in the test.

Analysis of this product showed:

P=3.1%
S=8.1%

In accordance with the method of Procedure II described above, the results obtained for the above concentrate combination of additives, using various organic epoxy compounds with and without a catalyst, are shown in Table 3 below.

Table 3

EVOLUTION OF HYDROGEN SULFIDE AT 200° F.

| Example | Epoxy Compound | Wt. Percent as Oxirane Oxygen | Catalyst | Wt. Percent | Time in Minutes to Evolve | | |
|---|---|---|---|---|---|---|---|
| | | | | | 1 mg. $H_2S$ | 5 mg. $H_2S$ | 9 mg. $H_2S$ |
| 24 | None | | None | | | | 37 |
| 25 | Toloxyepoxypropane | 0.007 | ----do---- | | | 60 | |
| | | 0.007 | Calcium Mahogany Soap | 0.5 | | 340 | |
| 26 | Epoxynonane | 0.007 | None | | | 26 | |
| | | 0.007 | Calcium Alkyl Phenate | 0.5 | | 460 | |
| 27 | Epoxynonane | 0.008 | None | | | | 70 |
| | | | Calcium Wax Aromatic Sulphonate | 0.6 | | | 240 |
| 28 | Epoxyhexane | 0.007 | None | | | | 50 |
| | | | Calcium Wax Aromatic Sulphonate | 0.6 | | | 240 |

The examples of foregoing tests show quantitatively that organic epoxy compounds in combination with a catalyst will substantially inhibit the odorous release of hydrogen sulfide from organic compositions under all conditions of storage and use, particularly when the organic composition contains compounds which release $H_2S$ under atmospheric as well as elevated temperatures. It is to be noted that in instances where the epoxy compound alone was employed, the organic composition possessed the characteristic odor of hydrogen sulfide, and which was so readily evolved as to completely consume the lead acetate in the absorbers in a short time. On the other hand, the combination of the epoxy compound with a catalyst substantially prevented the evolution of hydrogen sulfide to the extent that the lubricating oil did not possess a bad odor. The diverse chemical structure of the epoxy compounds employed in the tests is further proof that the stabilizing characteristic of epoxy compounds is primarily due to the structure

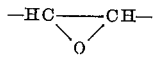

However, it is not to be construed that all epoxy compounds are equivalent in effectiveness because as shown by the test results some types of compounds are more specific than others for the purposes set forth.

PROCEDURE III

This procedure is concerned with qualitatively testing the stability of lubricating oil compositions under exemplary atmospheric storage conditions, and is supplementary to the quantitative methods of the foregoing test Procedures I and II.

A highly refined commercial mineral oil of S. A. E. 20 was used as the base lubricant. Three kinds of samples were prepared therefrom for storage testing:

A. Blank—nothing added to the base oil.
B. The base oil combined with commercial additives as follows:
1. KOH-$P_2S_5$ polyisobutylene detergent, 1.2% of oil.
2. Turpentine-$P_2S_5$ inhibitor, 1.5% of oil.

3. Containing both additives (1) and (2) in same amounts.

C. The oil composition of B3 plus various epoxy compounds with and without catalysts.

The various oil samples thus designated, in amount each of 50 ml., were stored in stoppered bottles at about 70° F. for 16 hours. Then the stoppers were removed and a moistened strip of lead acetate paper was suspended in the vapor space of each bottle and held in place there by putting back the stopper. The test stripped bottles then stood for an additional 24 hours at 70° F., at which time the strips were rated by color as to the relative amounts of hydrogen sulfide that had evolved and reacted with the lead acetate. The rating values arbitrarily ranged from zero to a maximum of 8; zero=white (no detectable $H_2S$), 8=totally black (representative of that amount of $H_2S$ which can be physiologically detected). The intermediate values between 0–8 are for progressively darkening shades of brown, finally to the black. The results of storage tests on the various oil samples are shown in Table 4, identified by the oil sample designations already stated. Thus it can be seen from these results that a catalyst is necessary for protection against objectionable odor development under storage conditions of finished oil compositions. It is also shown here that metal-containing epoxy compounds, Examples 34 and 35, are effective. However, on the basis of greater activity, the combination of a separate epoxy and catalyst compound is to be preferred.

concentrations above 0.003%, $H_2S$ odor was substantially absent, whereas, in the untreated control samples, the odor was obnoxiously evident.

The selection of the epoxy compound for the purposes of the present invention may be made on the basis of its boiling point as well as its degree of catalyzed activity depending on whether storage stabilization only is desired or if protection at elevated temperatures of use is also desired. For storage stabilization alone those epoxy compounds which are readily vaporized are to be preferred. In the case of lubricating oil compositions ordinarily the epoxy compound will be employed therein for storage purposes. However, I have found and will show by way of examples below that the presence of the epoxy compounds provided by this invention in lubricating oils under engine conditions have substantially no adverse effect on either lubricating efficiency or lubricated parts.

ENGINE TESTS

The conditions for odor control in lube oils having been established, engine tests were made to determine the effect of the hydrogen sulfide controlling agents upon the oil composition and lubricated parts under operating engine conditions.

The oil composition employed in the engine tests was a commercial S. A. E. 20 oil composition blend containing a terpene-$P_2S_5$ inhibitor and KOH-polyisobutylene-$P_2S_5$ detergent, the same as described for oil composition B3 above in

*Table 4*

$H_2S$ STORAGE STABILITY OF LUBRICATING OILS

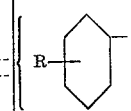

In addition to the laboratory tests described, a practical test was also conducted. In this, a commercial oil using additives of the type described in Procedure III which develop the odor of hydrogen sulfide on storage were employed. Various epoxides and catalysts of the kinds disclosed were added to this commercial oil and the treated oils together with untreated controls were then packaged in quart cans. These were stored at ambient temperature and sampled periodically. The test was made organoleptically by punching holes in the cans and immediately placing the nose over the hole. It was found, over a period of six months, that in every case, when epoxides were used in concentrations above 0.001% (as oxirane oxygen) with catalysts in Procedure III. The viscosity of this oil composition at 100° F. is 330 Saybolt seconds. Engine runs were made on this oil as a control and on the oil to which had been added the hydrogen sulfide controlling agents.

The test consisted of operating a Chevrolet engine dynamometer loaded under the conditions:

Miles to run, 5,000 (3,150 revolutions/mile).
R. P. M., 2,750 (19.0 horse power).
Oil sump temperature, 260° F.
Cooling water inlet, 175° F.
Cooling water outlet, 185° F.
Bearing inserts of CuPb, weighed before run.

Upon completion of the run the oil is drained and submitted to analysis. The engine is disassembled and examined as to the condition of its parts; bearing weight loss (a measure of bearing corrosion) is measured, and the extent of varnish, sludge and carbon deposits is evaluated. The condition of the engine generally is given a demerit rating as to cleanliness with reference to scale of 100.

Examples of the results thus gained from engine tests on several oil samples are shown in Table 5. With the exception of epichlorhydrin, the results are exemplary in showing that generally the epoxy compounds do not interfere with engine performance; actually in instances there is an improvement as may be noted from a comparison of the used oil analysis in the presence and absence of the epoxy compounds. Epichlorhydrin (Example 49), however, is unsatisfactory as previously indicated; note particularly its corrosiveness as measured by a CuPb bearing weight loss of 0.209 grams as against about 0.03-0.04 gram for the oil composition with and without the catalyzed epoxy compounds of this invention (Examples 47 and 48).

ing a sulphur-bearing compound which releases hydrogen sulphide upon standing or use and a minor but effective amount of an organic epoxy compound to inhibit the malodorous characteristics caused by the evolution of hydrogen sulphide from said composition, the improvement which consists in including in said composition, as a catalyst co-operating with said epoxy compound to activate the same, a minor amount of a metallic salt of an organic sulphonic acid.

5. In the method of treatment of organic compositions having hydrogen sulphide in solution with minor but effective amounts of organic epoxy compounds to inhibit the malodorous characteristics caused by the evolution of hydrogen sulphide from said compositions, the improvement which consists in including in said composition, as a catalyst co-operating with the epoxy compound to activate the same, a minor amount of a metallic salt of an organic sulphonic acid.

6. In the method of treatment of lubricating oil compositions containing sulphur-bearing

*Table 5*

ENGINE RUNS

| Example | Epoxy Compound | Wt. Percent Oxirane Oxygen | Catalyst, Ca diwax benzene sulfonate Wt. Percent | Bearing wt. loss g./half bearing | Engine Results | | | | Oil Analysis after Engine Run | | | | | | |
|---|---|---|---|---|---|---|---|---|---|---|---|---|---|---|---|
| | | | | | Varnish | Sludge | Carbon | Demerits | Acid No. | Insolubles | | Asphaltenes | Soluble Resins | Ramsden Carbon Res. | Viscosity Saybolt sec. 100° F. |
| | | | | | | | | | | Pentane | Benzene | | | | |
| 46 | Control oil | 0 | 0 | 0.044 | 6.5 | 4.5 | 7.0 | 15 | 4.4 | 2.18 | 1.52 | 0.66 | 9.7 | 2.42 | 424 |
| 47 | Nonane epoxide | 0.008 | 0.5 | 0.029 | 4.0 | 3.0 | 7.0 | 11 | 3.5 | 1.11 | 0.91 | 0.20 | 7.4 | 1.92 | 376 |
| 48 | Toloxyepoxypropane | 0.020 | 0.5 | 0.039 | 8.0 | 3.5 | 7.5 | 14.5 | 3.1 | 1.14 | 0.89 | 0.25 | 7.2 | 1.97 | 398 |
| 49 | Epichlorhydrin | 0.017 | 0 | 0.209 | 8.0 | 2.5 | 6.5 | 13 | 11.8 | 2.01 | 1.41 | 0.60 | 11.8 | 2.47 | 567 |

Having thus described the invention by giving several illustrations thereof, it is to be understood that no undue limitations or restrictions should be placed on the scope thereof by reason of the specific illustrations, but that the scope of the present invention is defined by the appended claims.

I claim:

1. In an organic composition having hydrogen sulphide in solution containing a minor but effective amount of an organic epoxy compound to inhibit the malodorous characteristics caused by the evolution of hydrogen sulphide from said composition, the improvement which consists in including in said composition, as a catalyst co-operating with the epoxy compound to activate the same, a minor amount of a metallic salt of an organic sulphonic acid.

2. The composition of claim 1 in which the metallic salt of an organic sulphonic acid is present in amounts between about .001 and 1 per cent of the composition.

3. The composition of claim 1 in which the metallic radical is a polyvalent metal.

4. In a lubricating oil composition contain-compounds which release hydrogen sulphide upon standing or use with minor but effective amounts of organic epoxy compounds to inhibit the malodorous characteristics caused by the evolution of hydrogen sulphide from said compositions, the improvement which consists in including in said composition, as a catalyst co-operating with said epoxy compound to activate the same, a minor amount of a metallic salt of an organic sulphonic acid.

References Cited in the file of this patent

UNITED STATES PATENTS

| Number | Name | Date |
|---|---|---|
| 2,316,082 | Loane | Apr. 6, 1943 |
| 2,320,047 | Nygaard et al. | May 25, 1943 |
| 2,369,908 | McCleary | Feb. 20, 1945 |
| 2,416,281 | Berger et al. | Feb. 25, 1947 |
| 2,455,061 | Hoover | Nov. 30, 1948 |
| 2,473,431 | Hoover | June 14, 1949 |
| 2,481,570 | Champagnat | Sept. 13, 1949 |
| 2,496,508 | Watson et al. | Feb. 7, 1950 |
| 2,510,031 | Folda | May 30, 1950 |
| 2,530,561 | Arnold et al. | Nov. 21, 1950 |
| 2,575,989 | Arundale et al. | Nov. 20, 1951 |